United States Patent
Higashi et al.

(10) Patent No.: US 7,417,845 B2
(45) Date of Patent: Aug. 26, 2008

(54) ELECTRIC DOUBLE-LAYER CAPACITOR, ELECTRIC ENERGY STORAGE DEVICE INCLUDING THE SAME, AND PRODUCTION METHOD FOR ELECTRIC DOUBLE-LAYER CAPACITOR

(75) Inventors: Yoji Higashi, Mitaka (JP); Ryutaro Nozu, Tokyo (JP)

(73) Assignees: Japan Radio Co., Ltd., Tokyo (JP); Nisshinbo Industries, Inc., Tokyo (JP)

( * ) Notice: Subject to any disclaimer, the term of this patent is extended or adjusted under 35 U.S.C. 154(b) by 238 days.

(21) Appl. No.: 10/586,030

(22) PCT Filed: Jan. 20, 2005

(86) PCT No.: PCT/JP2005/000681

§ 371 (c)(1), (2), (4) Date: Jul. 13, 2006

(87) PCT Pub. No.: WO2005/069322

PCT Pub. Date: Jul. 28, 2005

(65) Prior Publication Data

US 2007/0258191 A1    Nov. 8, 2007

(30) Foreign Application Priority Data

Jan. 20, 2004    (JP)    ............................. 2004-011522

(51) Int. Cl.
H01G 9/00    (2006.01)
(52) U.S. Cl. .................... 361/502; 361/503; 29/25.03
(58) Field of Classification Search ......... 361/502–503; 29/25.03
See application file for complete search history.

(56) References Cited

U.S. PATENT DOCUMENTS

| 6,201,686 | B1 * | 3/2001 | Hiratsuka et al. | ........... 361/502 |
| 6,795,297 | B2 * | 9/2004 | Iwaida et al. | ................ 361/502 |
| 2006/0098388 | A1 * | 5/2006 | Kirchner et al. | ............. 361/502 |

FOREIGN PATENT DOCUMENTS

| JP | 4-154106 | | 5/1992 |
| JP | 5-23527 | | 3/1993 |
| JP | 05267101 A | * | 10/1993 |
| JP | 7-111227 | | 4/1995 |

(Continued)

OTHER PUBLICATIONS

International Search Report for PCT/JP2005/000681 dated May 10, 2005 (2 pages).

(Continued)

*Primary Examiner*—Eric Thomas
(74) *Attorney, Agent, or Firm*—Osha Liang LLP

(57) ABSTRACT

A positive side terminal electrode and a negative side terminal electrode which are exposed to the exterior of a resin enclosure pass through a positive side opening and a negative side opening formed on the enclosure, respectively, and are connected to a positive side electrode and a negative side electrode, respectively, of an electric double-layer capacitor put away in the interior of the enclosure. The positive side terminal electrode is thermally welded to inner surfaces of the positive side opening over the entire periphery thereof, and the negative side terminal electrode is thermally welded to inner surfaces of the negative side opening over the entire periphery thereof.

15 Claims, 7 Drawing Sheets

FOREIGN PATENT DOCUMENTS

| | | |
|---|---|---|
| JP | 11-40468 | 2/1999 |
| JP | 2002-279967 | 9/2002 |
| JP | 2003-59783 | 2/2003 |

OTHER PUBLICATIONS esp@cenet Patent Abstract JP4154106 dated May 27, 1992 (1 page).

esp@cenet Patent Abstract JP2002279967 dated Sep. 27, 2002 (1 page).
esp@cenet Patent Abstract JP11040468 dated Feb. 12, 1999 (1 page).
esp@cenet Patent Abstract JP7111227 dated Apr. 25, 1995 (1 page).
esp@cenet Patent Abstract JP2003059783 dated Feb. 28, 2003 (1 page).
Excerpt from Japanese Utility Model Laid-Open Publication No. HEI 5-23527 (translation) (1 page).

* cited by examiner

ELECTRIC DOUBLE-LAYER CAPACITOR, ELECTRIC ENERGY STORAGE DEVICE INCLUDING THE SAME, AND PRODUCTION METHOD FOR ELECTRIC DOUBLE-LAYER CAPACITOR

TECHNICAL FIELD

The present invention relates to an electric double-layer capacitor capable of repetitive charge and discharge, an electric energy storage device including such an electric double-layer capacitor, and a manufacturing method of an electric double-layer capacitor.

BACKGROUND ART

Electric double-layer capacitors have been used as electric energy storage devices which can be charged and discharged repetitively. Electric double-layer capacitors are advantageous over secondary batteries that use an electrochemical reaction, in that high-speed charge/discharge using a large amount of current is possible and that they have long service life.

Japanese Patent Laid-Open Publication No. Hei 4-154106 discloses technology related to electric double-layer capacitors. In this related art, an electric double-layer capacitor body formed by alternately layering positive and negative electrodes having a flat plate shape with a separator being disposed between these electrodes is put away in an enclosure in a state where the electric double-layer capacitor body is immersed in an electrolyte solution. A lead portion extending from a charge collector in the plurality of positive and negative electrodes is joined to an external terminal disposed on a cover of the enclosure.

At the time of charging/discharging of an electric double-layer capacitor, impurities or the like present in an electrolyte solution cause generation of gas, which then increases the pressure in the interior of the enclosure. In the related art described above, due to such an increased pressure or corrosion in the interior of the enclosure, the joint portion between the external terminals and the cover of the enclosure is damaged and deteriorated, which makes it impossible to maintain the sealing property in the interior of the enclosure. This leads to a problem that the electrolyte solution leaks, to thereby degrade the characteristics of the electric double-layer capacitor. The above related art also suffers from a problem that the increased pressure within the enclosure causes deformation of the enclosure.

The present invention advantageously provides an electric double-layer capacitor with an enhanced sealing property in the interior of an enclosure, an electric energy storage device including such an electric double-layer capacitor, and a manufacturing method of an electric double-layer capacitor. The present invention further advantageously provides an electric double-layer capacitor which can prevent leakage of an electrolyte solution even with an increase in the pressure in the interior of the enclosure, thereby preventing deformation of the enclosure.

DISCLOSURE OF THE INVENTION

In order to achieve at least some of the above advantages, an electric double-layer capacitor, an electric energy storage device including an electric double-layer capacitor, and a manufacturing method of an electric double-layer capacitor according to an aspect of the present invention have the following structures.

In an electric double-layer capacitor according to the present invention, an electric double-layer capacitor body having a positive side electrode and a negative side electrode which are opposed to each other via a separator is put away in the interior of an enclosure made of a resin in a state where the electric double-layer capacitor body is impregnated with an electrolyte solution, and a positive side terminal portion and a negative side terminal portion exposed to the exterior of the enclosure pass through a positive side opening and a negative side opening, respectively, formed on the enclosure and are connected to the positive side electrode and the negative side electrode, respectively, and the positive side terminal portion is welded to inner surfaces of the positive side opening over the entire periphery thereof, and the negative side terminal portion is welded to inner surfaces of the negative side opening over the entire periphery thereof.

In the present invention, by virtue of the positive side terminal portion being welded to inner surfaces of the positive side opening formed on the enclosure over the entire periphery thereof and the negative side terminal portion being welded to inner surfaces of the negative side opening formed on the enclosure over the entire periphery thereof, adhesion between the positive side and negative side terminal portions and the enclosure can be enhanced, so that the sealing property in the interior of the enclosure housing the electric double-layer capacitor can also the enhanced.

In the electric double-layer capacitor according to the present invention, the positive side terminal portion and the negative side terminal portion may be welded to the inner surfaces of the positive side opening and the inner surfaces of the negative side opening, respectively, over the entire peripheries thereof, via resin sheets. With this structure, adhesion between the positive side and negative side terminal portions and the enclosure can be further enhanced. In the electric double-layer capacitor according to this aspect of the invention, the enclosure may be formed of a synthetic resin having chemical resistance and thermoplasticity, and the sheet may be formed of a synthetic resin having chemical resistance and thermoplasticity. With this structure, the enclosure and the sheets can be joined by thermal bonding, and chemical resistance can be enhanced. In the electric double-layer capacitor according to this aspect of the invention, the enclosure may be formed of a resin obtained by mixing one or more types of polypropylene-series, polystyrene-series, polyethylene-series, polyester-series, and polyimide-series, and the sheet may be formed of a resin obtained by mixing one or more types of polypropylene-series, polystyrene-series, polyethylene-series, polyester-series, and polyimide-series.

The electric double-layer capacitor according to the present invention may comprise a pressure relief valve connecting the interior of the enclosure to the exterior when a pressure in the interior of the enclosure exceeds a predetermined pressure. With this structure, deformation of the enclosure caused by an increased pressure within the enclosure can be prevented, further leading to prevention of deterioration in the joint portions on the enclosure. In addition, leakage of the electrolyte solution can also be prevented.

In the electric double-layer capacitor according to the present invention, a reinforcing portion may be provided on a surface forming the enclosure. With this structure, as deformation of the enclosure caused by an increased pressure within the enclosure can be prevented, deterioration in the joint portions on the enclosure can also be prevented.

In an electric energy storage device including a plurality of electric double-layer capacitors according to the present invention which are connected in series, a correction circuit for correcting a variation in voltages among the plurality of electric double-layer capacitors may be contained within the electric energy storage device. With this structure, electric energy can be effectively stored in each of the electric double-layer capacitors, which are connected in series, and a small-size electric energy storage device can be realized.

According to the present invention, in a method of manufacturing an electric double-layer capacitor in which an electric double-layer capacitor body having a positive side electrode and a negative side electrode which are opposed to each other via a separator is put away in the interior of an enclosure made of a resin in a state where the electric double-layer capacitor body is impregnated with an electrolyte solution and a positive side terminal portion and a negative side terminal portion exposed to the exterior of the enclosure pass through a positive side opening and a negative side opening, respectively, formed on the enclosure and are connected to the positive side electrode and the negative side electrode, respectively, the method includes a first welding process of welding a sheet made of a resin to each of a joint portion on the positive side terminal portion which is to be joined to inner surfaces of the positive side opening and a joint portion on the negative side terminal portion which is to be joined to inner surfaces of the negative side opening over the entire peripheries of the joint portions; and a second welding process of welding the sheet which is welded to the positive side terminal portion to the inner surfaces of the positive side opening over the entire periphery thereof and welding the sheet which is welded to the negative side terminal portion to the inner surfaces of the negative side opening over the entire periphery thereof.

According to the present invention, adhesion between the positive side and negative side terminal portions and the enclosure can be increased, whereby the sealing property in the interior of the enclosure housing the electric double-layer capacitor can be enhanced.

In a method of manufacturing an electric double-layer capacitor according the present invention, the enclosure may be formed of a synthetic resin having chemical resistance and thermoplasticity, and the sheet may be formed of a synthetic resin having chemical resistance and thermoplasticity. With this structure, the enclosure and the sheets can be joined by thermal bonding, and chemical resistance can be enhanced. In a method of manufacturing an electric double-layer capacitor according to this aspect of the invention, the enclosure may be formed of a resin obtained by mixing one or more types of polypropylene-series, polystyrene-series, polyethylene-series, polyester-series, and polyimide-series, and the sheet may be formed of a resin obtained by mixing one or more types of polypropylene-series, polystyrene-series, polyethylene-series, polyester-series, and polyimide-series.

BRIEF DESCRIPTION OF THE DRAWINGS

These and other objects of the invention will be explained in the description below, in connection with the accompanying drawings, in which.

BEST MODE FOR CARRYING OUT THE INVENTION

Preferred embodiments of the present invention will be described with reference to the drawings.

Figure 1:
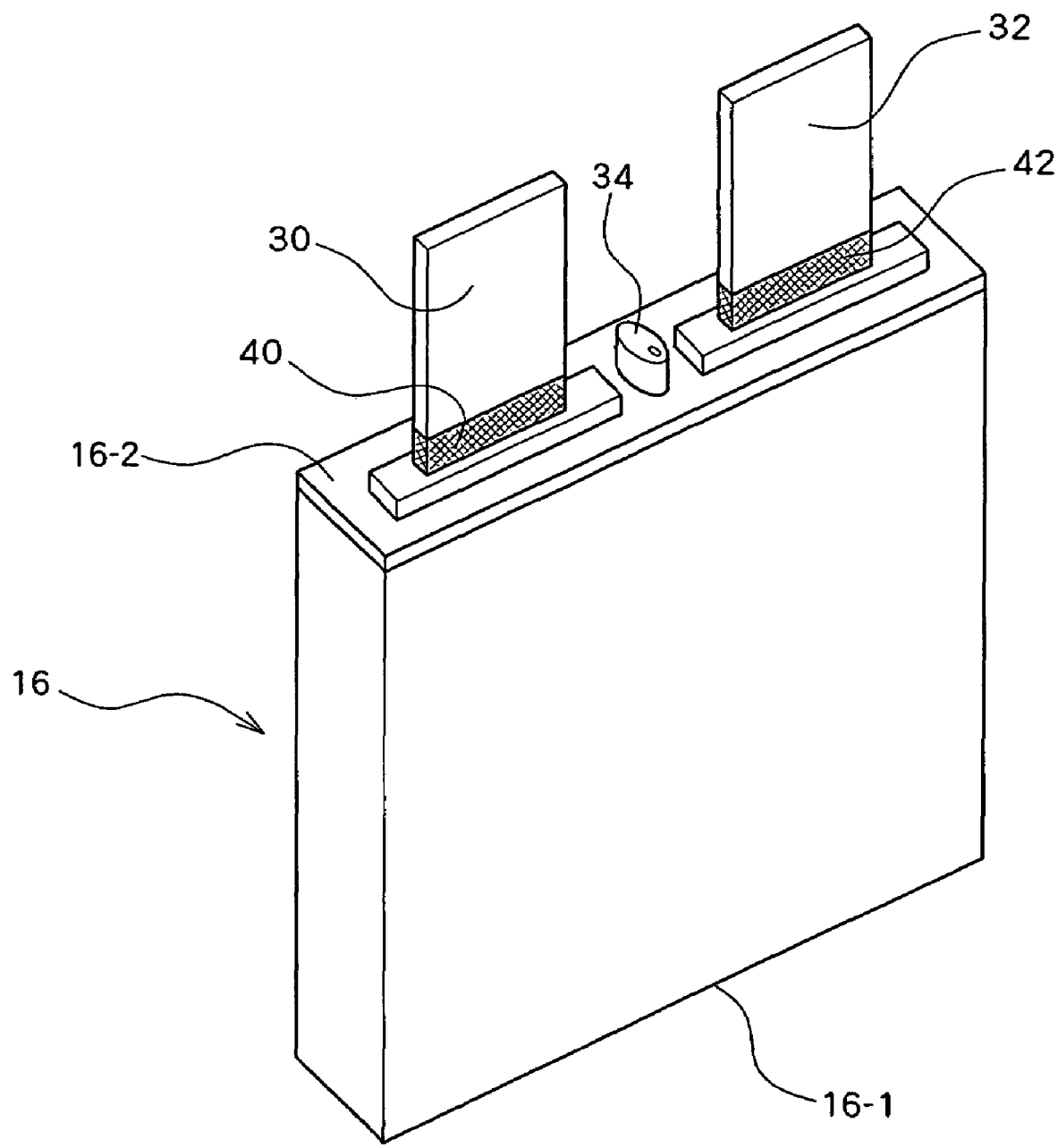
FIG. 1 is a schematic perspective view showing a structure of an electric double-layer capacitor according to an embodiment of the present invention.
Figure 2:
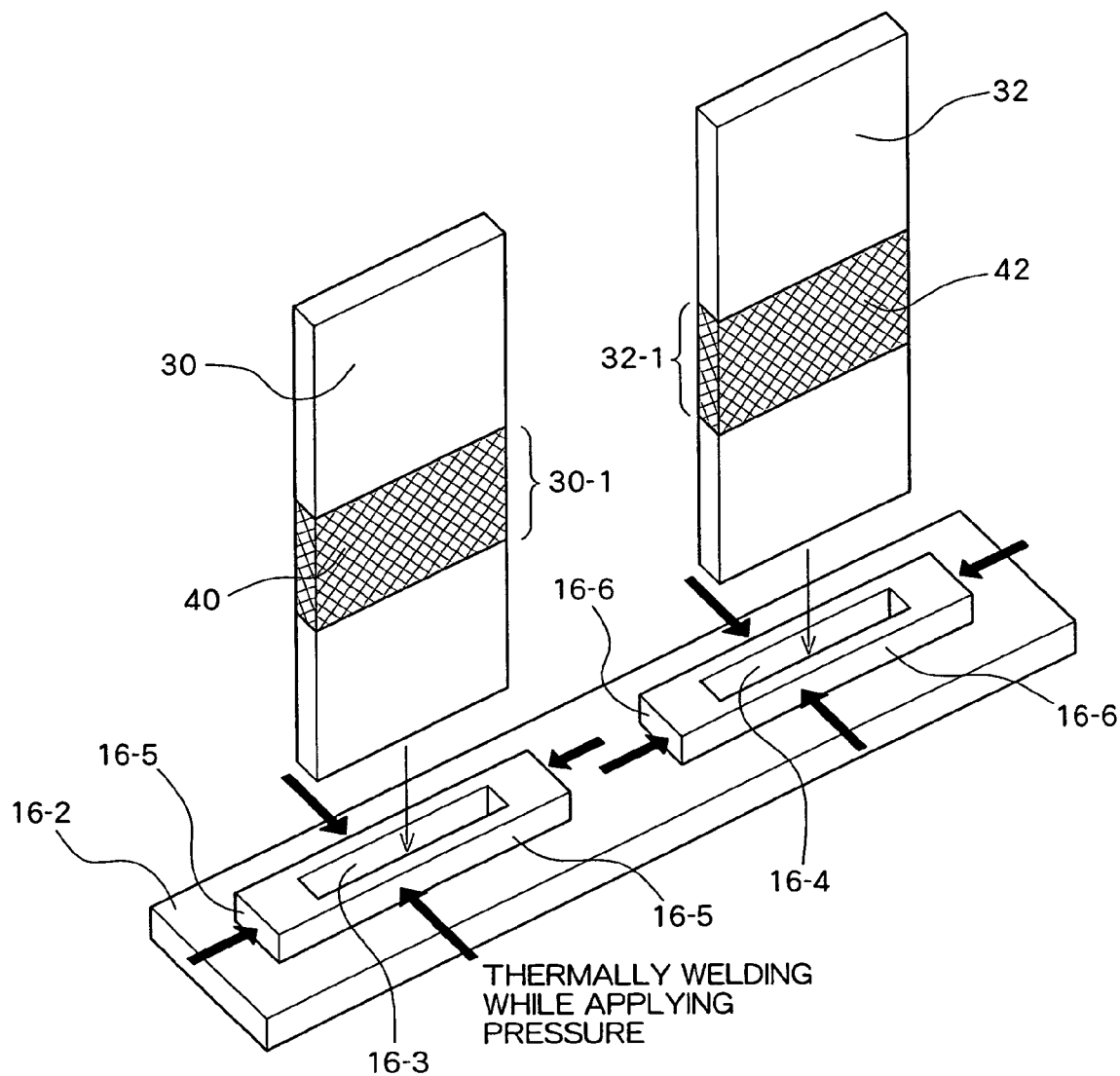
FIG. 2 is an exploded perspective view showing a peripheral portion of positive and negative terminal electrodes in the electric double-layer capacitor of the embodiment.
Figure 3:
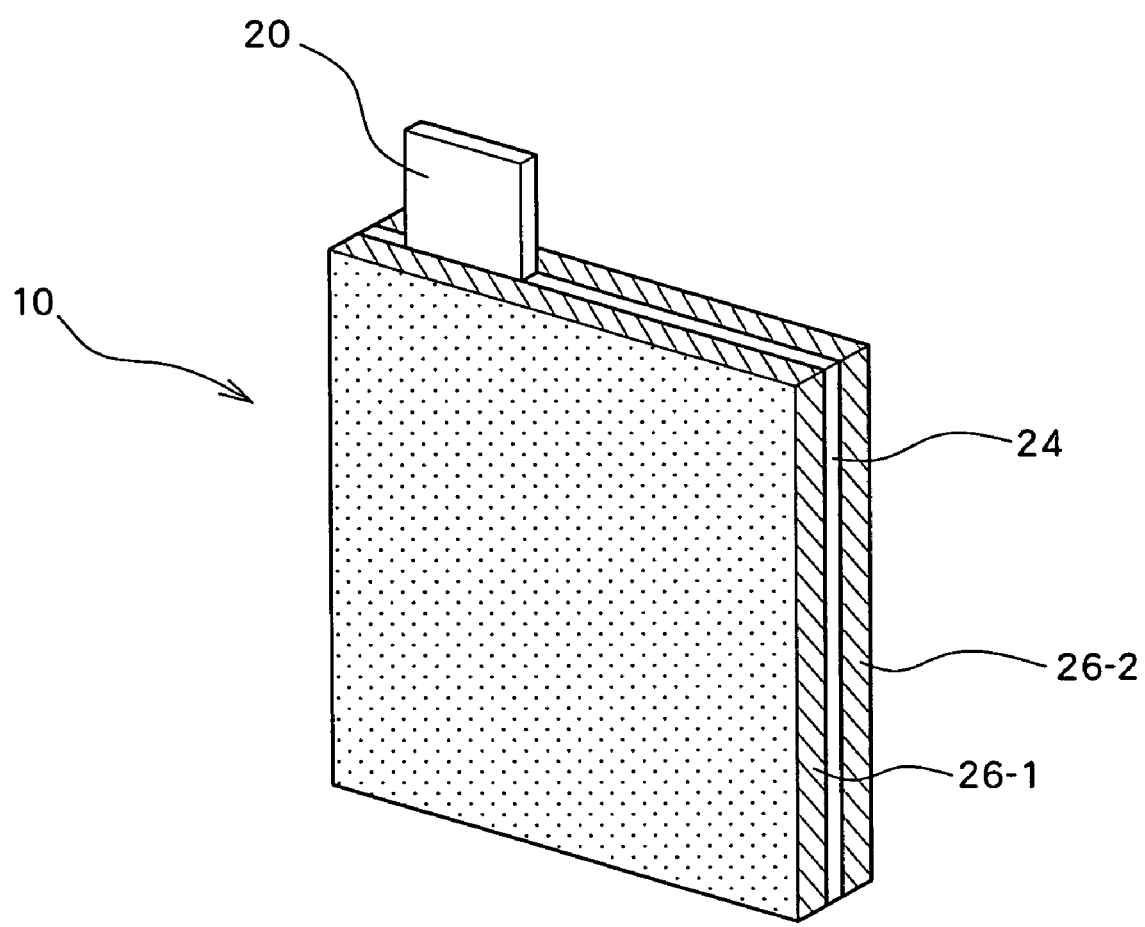
FIG. 3 is an exploded perspective view schematically showing a structure of an electric double-layer capacitor body.
Figure 4:
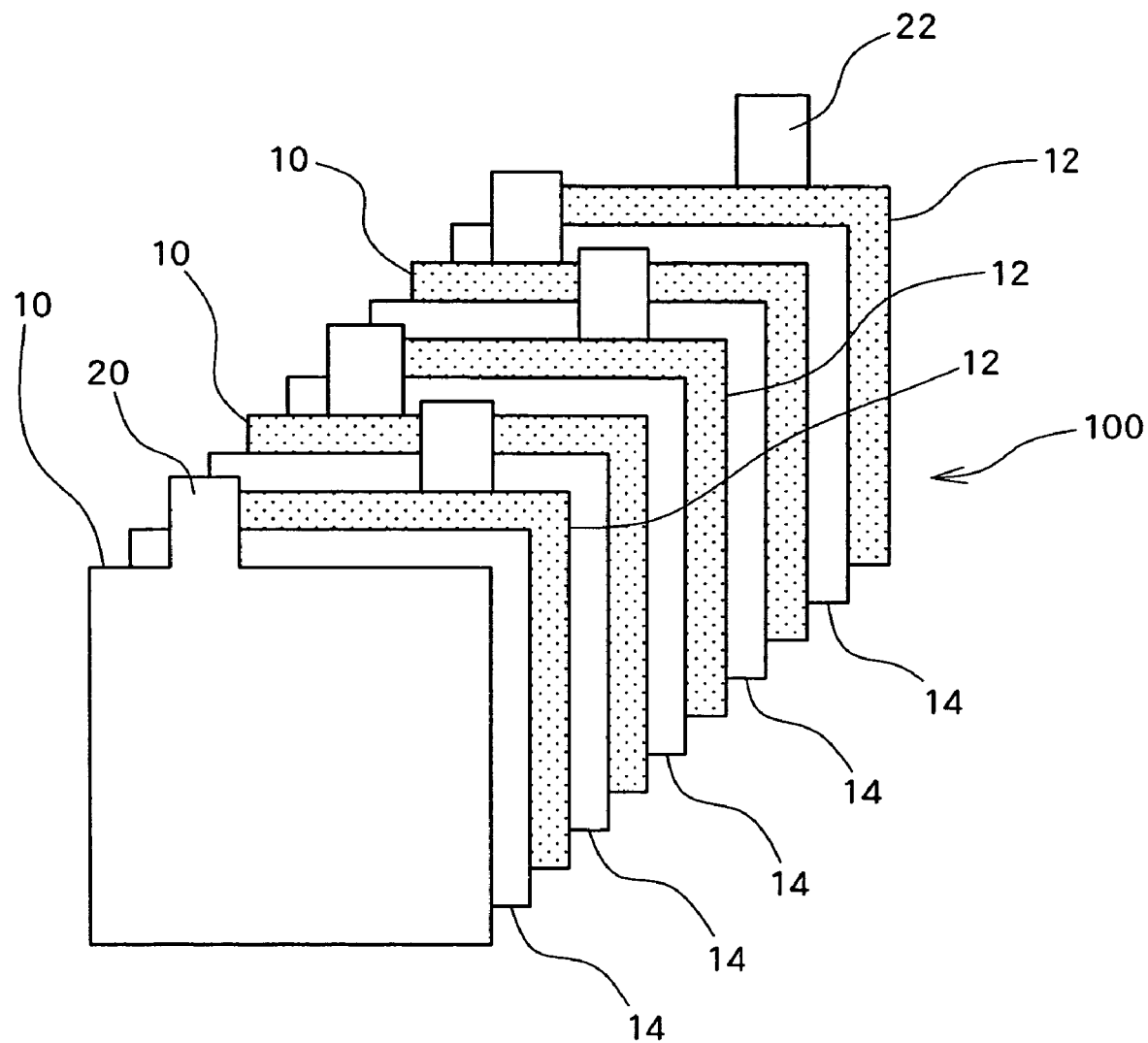
FIG. 4 is a schematic perspective view showing a structure of a positive electrode plate.

FIGS. 1 to 4 schematically show a structure of an electric double-layer capacitor according to an embodiment of the present invention. Specifically, FIG. 1 is a perspective view showing the overall appearance of the capacitor; FIG. 2 is an exploded perspective view showing a peripheral portion of positive side and negative side terminal electrodes; FIG. 3 is a perspective view showing a positive side electrode plate, and FIG. 4 is an exploded perspective view showing an electric double-layer capacitor body put away in the interior of an enclosure. In an electric double-layer capacitor according to the present embodiment, an electric double-layer capacitor body 100 includes positive side electrode plates 10 and negative side electrode plates 12 both having a flat plate shape which are arranged opposed to each other with a separator 14 being disposed between each pair of positive side and negative side electrode plates, and the electric double-layer capacitor body 100 is put away within an enclosure 16 in a state where the electric double-layer capacitor body 100 is impregnated with an electrolyte solution. A positive side terminal electrode 30 and a negative side terminal electrode 32 having a flat plate shape which are exposed to the exterior of the enclosure 16 are connected with the positive side electrode plate 10 and the negative side electrode plate 12, respectively, in the interior of the enclosure 16.

As shown in FIG. 3, in the positive side electrode plate 10, polarized electrodes 26-1 and 26-2 are formed on respective sides of a flat plate shape charge collector 24. Also, a lead portion 20 to be connected to the positive side terminal electrode 30 extends from the charge collector 24. Further, the negative side electrode plate 12 has the same structure as that of the positive side terminal plate 10, except for the location of a lead portion 22 extending from the negative side electrode plate 12 for connecting with the negative side terminal electrode 32.

As shown in FIG. 4, the positive side electrode plate 10 and the negative side electrode plate 12 are alternately layered via the separator 14 a plurality of times, thereby forming the electric double-layer capacitor body 100. The lead portions 20 of the positive side electrode plates 10 are coupled to form a single lead portion, which is then connected to the positive side terminal electrode 30. Similarly, the lead portions 22 of the negative side electrode plates 12 are coupled to form a single lead portion, which is then connected to the negative side terminal electrode 32.

The enclosure 16 is composed of a rectangular body portion 16-1 housing the electric double-layer capacitor body 100, and a cover portion 16-2 used for sealing. A variety of resins can be used as a material of the enclosure 16, among which a synthetic resin having chemical resistance and thermoplasticity is preferably used. Specific examples of such a synthetic resin include resins obtained by mixing one or more types of polypropylene-series, polystyrene-series, polyethylene-series, polyester-series, and polyimide-series. The electric double-layer capacitor body 100 is first put away in the body portion 16-1 of the enclosure 16 while being immersed in an electrolyte solution, and then the body portion 16-1 of the enclosure 16 and the cover portion 16-2 are joined.

As shown in FIG. 2, in the cover portion 16-2 of the enclosure 16, a positive side opening 16-3 having a substantially rectangular shape which allows the flat plate positive side terminal electrode 30 to pass through and a negative side opening 16-4 having a substantially rectangular shape which allows the flat plate negative side terminal electrode 32 to pass through are formed. The positive side terminal electrode 30 is allowed to pass through the positive side opening 16-3 and is joined to the inner surfaces of the positive side opening 16-3, and the negative side terminal electrode 32 is allowed to pass through the negative side opening 16-4 and is joined to the inner surfaces of the negative side opening 16-4.

Further, positive side pressure application surfaces 16-5 which are substantially parallel to the inner surfaces of the positive side opening 16-3 are formed surrounding the entire outer periphery of the positive side opening 16-3. By applying a pressing force to the positive side pressure application surfaces 16-5, the pressing force is also applied to the positive side terminal electrode 30 inserted through the positive side opening 16-3. Similarly, negative side pressure application surfaces 16-6 which are substantially parallel to the inner surfaces of the negative side opening 16-4 are formed surrounding the entire outer periphery of the negative side opening 16-4. By applying a pressing force to the negative side pressure application surfaces 16-6, the pressing force is also applied to the negative side terminal electrode 32 inserted through the negative side opening 16-4.

As shown in FIG. 1, a pressure relief valve 34 is provided on the cover portion 16-2 of the enclosure 16. The pressure relief valve 34 is closed when the pressure in the interior of the enclosure 16 is a predetermined pressure or less. On the other hand, when the pressure in the enclosure 16 exceeds the predetermined pressure, the pressure relief valve 34 is opened to bring the interior of the enclosure 16 into communication with the exterior thereof for exhausting the internal gas and reducing the pressure in the interior of the enclosure 16, as a result of which the relief valve 34 is closed. With the operation of this pressure relief valve 34, the internal pressure of the enclosure 16 is maintained to a pressure which is equal to or less than the predetermined pressure. Here, the pressure relief valve 34 may be provided at any location other than on the cover portion 16-2 of the enclosure 16, and may be provided on the body portion 16-1 of the enclosure, for example.

At the time of manufacturing the electric double-layer capacitor according to the present embodiment, as shown in FIG. 2, a sheet 40 is thermally welded over the entire periphery of a joint portion 30-1 on the positive side terminal electrode 30 which is to be joined to the inner surfaces of the positive side opening 16-3, and a sheet 42 is thermally welded over the entire periphery of a joint portion 32-1 on the negative side terminal electrode 32 which is to be joined to the inner surfaces of the negative side opening 16-4. Here, similar to the enclosure 16, resins, particularly synthetic resins having chemical resistance and thermoplasticity, are used as the material of the sheets 40 and 42. Specifically, resins obtained by mixing one or more types of polypropylene-series, polystyrene-series, polyethylene-series, polyester-series, and polyimide-series can be used. Further, as a material of the positive side terminal electrode 30 and the negative side terminal electrode 32, aluminum is used, for example.

Subsequently, the positive side terminal electrode 30 having the sheet 40 thermally bonded thereto and the negative side terminal electrode 32 having the sheet 42 thermally welded thereto are allowed to pass through the positive side opening 16-3 and the negative side opening 16-4, respectively, and the sheet 40 and the inner surfaces of the positive side opening 16-3 are thermally welded together over the entire periphery thereof, and the sheet 42 and the inner surfaces of the negative side opening 16-4 are thermally welded together over the entire periphery thereof. In this case, by preforming positive side pressure application surfaces 16-5 and negative side pressure application surfaces 16-6 on the cover portion 16-2 of the enclosure 16 and performing welding while a pressing force is applied to all the positive side pressure application surfaces 16-5 and all the negative side pressure application surfaces 16-6, reliable thermal welding can be achieved over the entire peripheries around the sheets 40 and 42. In the example shown in FIG. 2, because the positive side terminal electrode 30 and the negative side terminal electrode 32 assume a flat plate shape, the thermal welding is performed while a pressing force is being applied to each of the four surfaces of the positive side pressure application surfaces 16-5 and to each of the four surfaces of the negative side pressure application surfaces 16-6. With the thermal welding processing described above, the positive side terminal electrode 30 is welded to the inner surfaces of the positive side opening 16-3 over the entire periphery thereof via the sheet 40, and the negative side terminal electrode 32 is welded to the inner surfaces of the negative side opening 16-4 over the entire periphery thereof via the sheet 42.

The lead portion 20 and the lead portion 22 of the electric double-layer capacitor body 100 formed in a layered structure are then joined to the positive side terminal electrode 30 and the negative side terminal electrode 32, respectively. Here, joining of the positive side terminal electrode 30 and the lead portion 20 and joining of the negative side terminal electrode 32 and the lead portion 22 may be performed either before or after the thermal welding of the positive side terminal electrode 30 and the inner surfaces of the positive side opening 16-3 and the thermal welding of the negative side terminal electrode 32 and the inner surfaces of the negative side opening 16-4.

Figure 5:
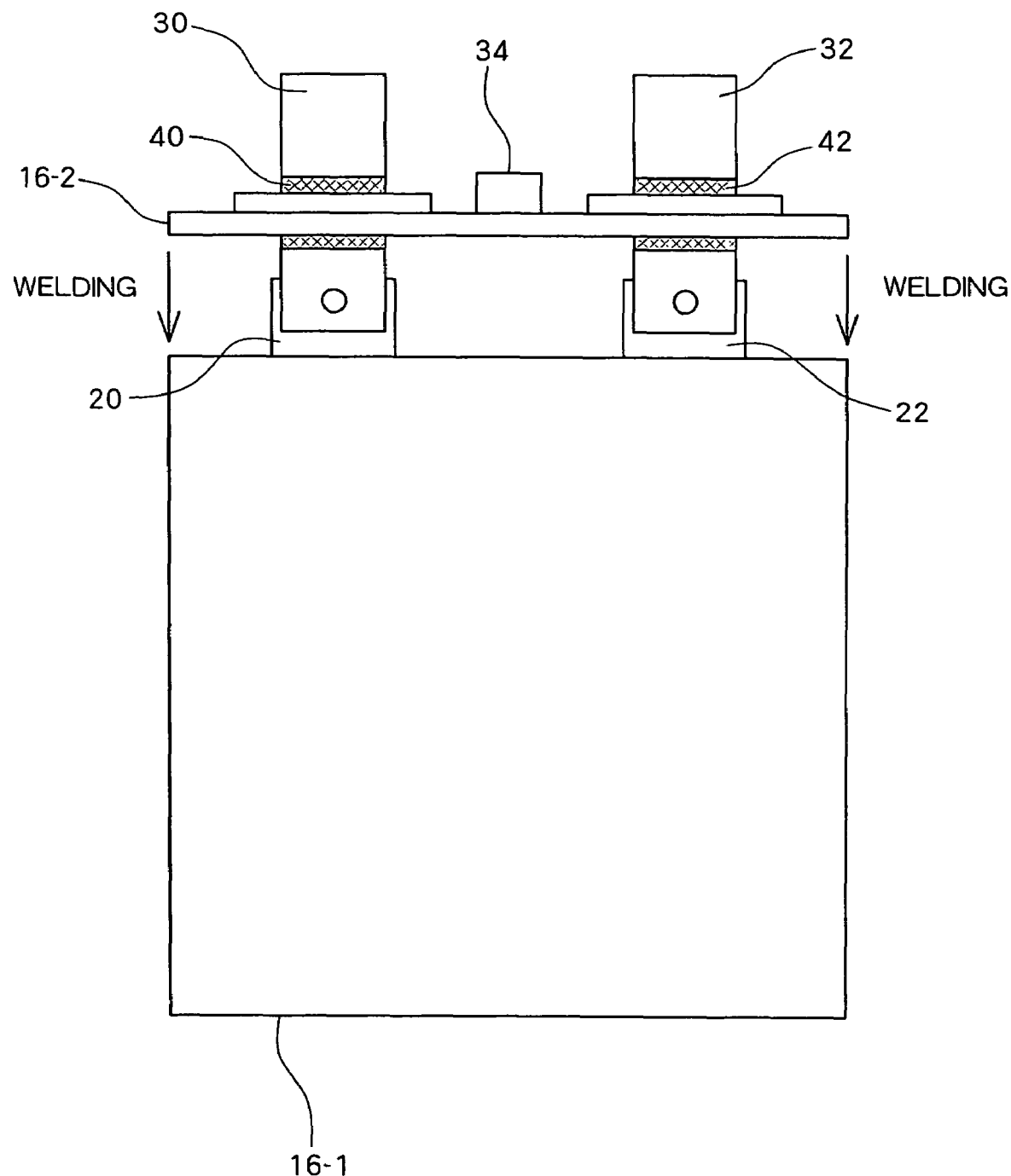
FIG. 5 is a view for explaining a process of welding the enclosure body portion and a cover portion.

As shown in a front view of FIG. 5, after completion of thermal welding of the terminal electrodes 30 and 32 to the cover portion 16-2 and joining between the thermal electrodes 30 and 32 and the lead portions 20 and 22, the electric double-layer capacitor body 100 is put away within the body portion 16-1 of the enclosure 16 in a state where the electric double-layer capacitor body 100 is immersed in an electrolyte solution, and then the body portion 16-1 of the enclosure 16 and the cover portion 16-2 of the enclosure are joined by thermally welding. Consequently, the electric double-layer capacitor body 100 is sealed, whereby the electric double-layer capacitor according to the present embodiment can be obtained.

As described above, according to the present embodiment, the synthetic resin sheet 40 having chemical resistance and thermoplasticity is thermally welded over the entire periphery of the joint portion 30-1 on the positive side terminal electrode 30 which is to be joined to the inner surfaces of the positive side opening 16-3, and the synthetic resin sheet 42 having chemical resistance and thermoplasticity is thermally welded over the entire periphery of the joint portion 32-1 on the negative side terminal electrode 32 which is to be joined to the inner surfaces of the negative side opening 16-4. Then, the sheet 40 and the inner surfaces of the positive side opening 16-3 are thermally welded over the entire periphery thereof, and the sheet 42 and the inner surfaces of the negative side opening 16-4 are thermally welded over the entire periphery thereof. Thus, the positive side terminal electrode 30 is thermally welded, via the sheet 40, to the inner surfaces of the positive side opening 16-3 over the entire periphery thereof, and the negative side terminal electrode 32 is thermally welded, via the sheet 42, to the inner surfaces of the negative side opening 16-4 over the entire periphery thereof, so that adhesion between the terminal electrodes 30 and 32 and the cover portion 16-2 of the enclosure 16 can be enhanced. Consequently, a sealing property of the enclosure 16 housing the electric double-layer capacitor body 100 can be enhanced, so that reliability with regard to leakage of the electrolyte solution in which the electric double-layer capacitor body 100 is immersed is enhanced to thereby achieve an extended life of the electric double-layer capacitor.

Further, according to the present embodiment, when the pressure of the interior of the enclosure 16 exceeds the predetermined pressure, the pressure relief valve 34 is opened to maintain the pressure of the interior of the enclosure to a pressure which is equal to or lower than the predetermined pressure. Consequently, deformation of the enclosure 16 caused by an increase in the pressure of the interior of the enclosure 16 can be prevented, so that deterioration of the joint portions joining the terminal electrodes 30 and 32 to the cover portion 16-2 of the enclosure 16 and the joint portion joining the body portion 16-1 of the enclosure and the cover portion 16-2 can also be prevented.

Figure 6:
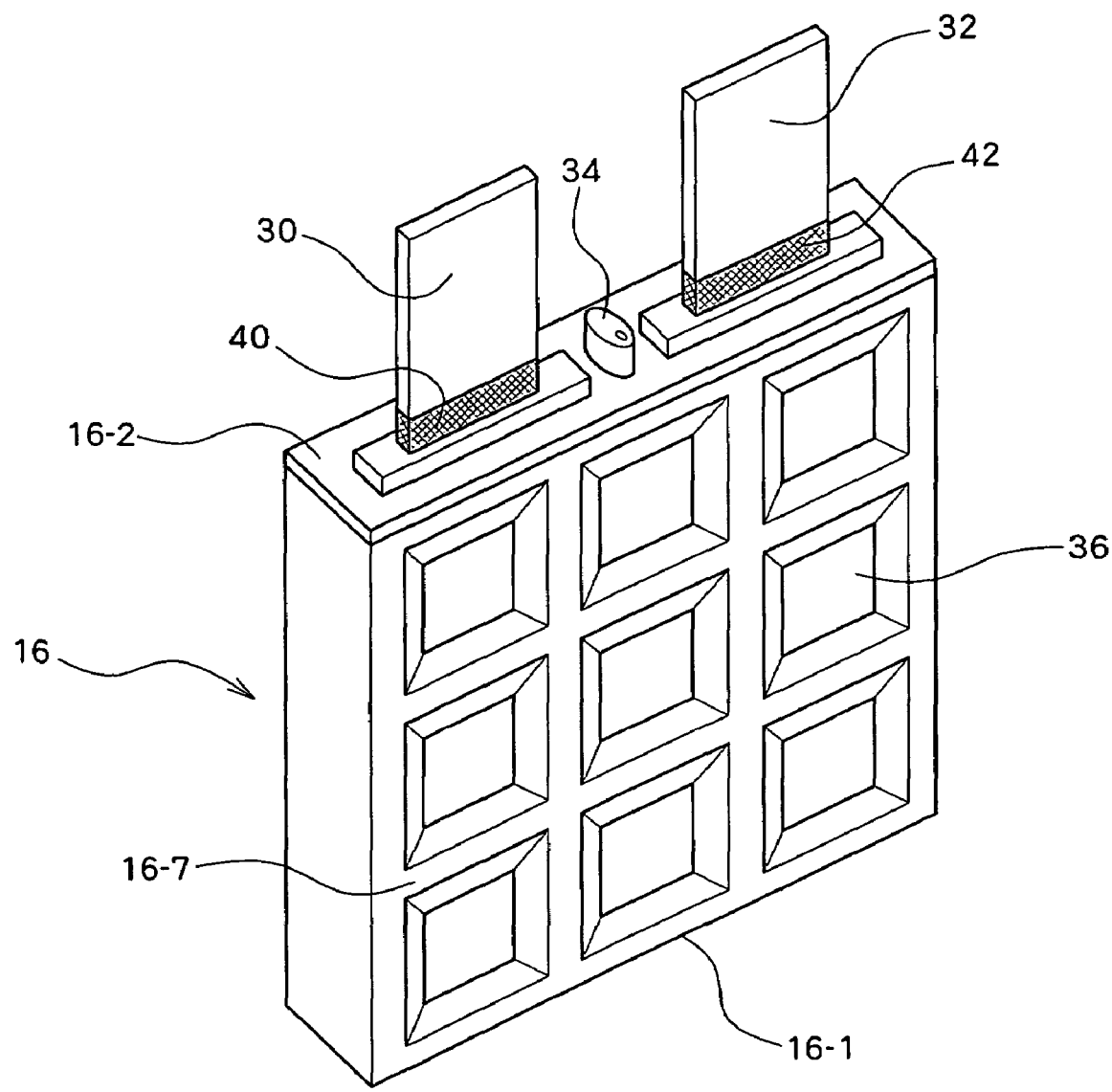
FIG. 6 is a schematic perspective view showing another structure of an electric double-layer capacitor according to another embodiment of the present invention.

In the present embodiment, as shown in FIG. 6, bead portions 36 for reinforcement may be provided on a surface 16-7 forming the enclosure 16. With these bead portions 36, stiffness of the surface 16-7 can be increased, which results in more reliable prevention of deformation of the enclosure 16 caused by increased pressure in the interior of the enclosure 16. Consequently, it is possible to more reliably prevent deterioration of the joint portions joining the terminal electrodes 30 and 32 and the cover portion 16-2 of the enclosure 16 and the joint portion joining the body portion 16-1 of the enclosure and the cover portion 16-2.

Further, when an increase in the output voltage of the electric double-layer capacitor is desired, a plurality of electric double-layer capacitors which are connected in series are used. In this case, however, due to a variation in capacitances of these electric double-layer capacitors, simultaneous charging of a plurality of electric double-layer capacitors connected in series causes a variation in charged voltages, which makes it difficult to effectively store electric energy in each of the electric double-layer capacitors.

Figure 7:
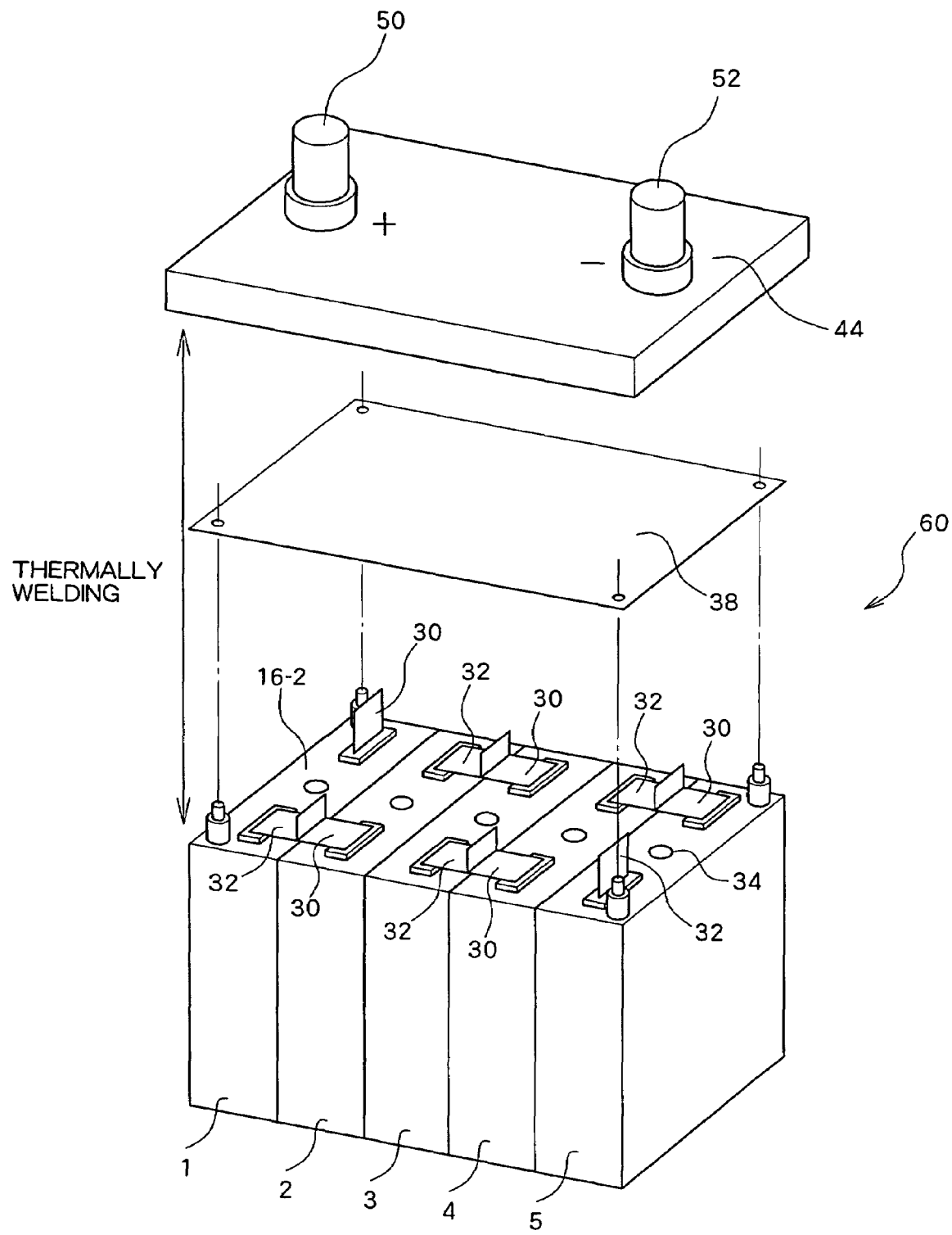
FIG. 7 is an exploded perspective view schematically showing a structure of an electric energy storage device formed by connecting a plurality of electric double-layer capacitors according to the embodiment of the present invention in series.

In order to address this disadvantage, there is provided an electric energy storage device 60 formed of a plurality of electric double-layer capacitors according to the present embodiment which are connected in series includes an equalizing charge/discharge circuit 38 for correcting a variation in voltages of these plurality of electric double-layer capacitors 1 to 5, as shown in an exploded perspective view of FIG. 7. In the electric energy storage device 60 shown in FIG. 7, the electric double-layer capacitors 1 to 5 according to the present embodiment are connected in series by connecting the positive side terminal electrode 30 of a certain electric double-layer capacitor with the negative side terminal electrode 32 of an electric double-layer capacitor adjacent to the certain capacitor. The equalizing charge/discharge circuit 38 is connected with each of the terminal electrodes 30 and 32 of each of the electric double-layer capacitors 1 to 5.

Further, the positive side terminal electrode 30 of the electric double-layer capacitor 1 is connected with a positive side external terminal 50 provided on a cover 44 having a flat plate shape, and the negative side terminal electrode 32 of the electric double-layer capacitor 5 is connected with a negative side external terminal 52 provided on the cover 44. Here, similar to the enclosure 16, a resin is used as a material of the cover 44, and particularly, a synthetic resin having chemical resistance and thermoplasticity is used. Specific examples of such synthetic resins include resins obtained by mixing one or more types of polypropylene-series, polystyrene-series, polyethylene-series, polyester-series, and polyimide-series. Further, although in the example shown in FIG. 7 the pressure relief valve 34 is provided in each of the electric double-layer capacitors 1 to 5, a single pressure relief valve 34 would suffice, so long as a passage of gas can be secured through the electric double-layer capacitors 1 to 5.

In the electric energy storage device 60 shown in FIG. 7, the cover 44 is joined to the cover portion 16-2 of the enclosure 16 of each electric double-layer capacitor 1 to 5 with the equalizing charge/discharge circuit 38 being interposed between the cover 44 and the cover portions 16-2, whereby the equalizing charge/discharge circuit 38 is contained within the electric energy storage device 60. Here, the cover 44 and the cover portions 16-2 of the enclosures 16 are thermally welded together with the equalizing charge/discharge circuit 38 being interposed therebetween.

Here, the equalizing charge/discharge circuit 38 can be implemented by a known circuit structure such as a balancing resistor which is connected in parallel with each of the electric double-layer capacitors 1 to 5, a bypass circuit including a voltage detector and a switch and connected in parallel with each of the electric double-layer capacitors 1 to 5, and so on. Therefore, in FIG. 7, the circuit structure of the equalizing charge/discharge circuit 38 is not shown and only a substrate on which the circuit is to be formed is shown.

The electric energy storage device 60 shown in FIG. 7, in which the equalizing charge/discharge circuit 38 is contained, is capable of effectively storing electric energy in each of the electric double-layer capacitors which are connected in series, thereby achieving a small-size electric energy storage device 60.

Embodiments for implementing the present invention have been described above. However, the present invention is not limited to the above embodiments, and also can be implemented by various other embodiments without departing from the scope of the present invention.

The invention claimed is:

1. An electric double-layer capacitor in which an electric double-layer capacitor body having a positive side electrode and a negative side electrode which are opposed to each other via a separator is put away in the interior of an enclosure made of a resin in a state where the electric double-layer capacitor body is impregnated with an electrolyte solution and a positive side terminal portion having a flat plate shape and a negative side terminal portion having a flat plate shape which are exposed to the exterior of the enclosure pass through a positive side opening and a negative side opening, respectively, formed on the enclosure and are connected to the positive side electrode and the negative side electrode, respectively, wherein
the positive side terminal portion is welded to inner surfaces of the positive side opening over the entire periphery thereof, and the negative side terminal portion is welded to inner surfaces of the negative side opening over the entire periphery thereof,
the positive side opening and the negative side opening formed on the enclosure are of a rectangular shape, positive side pressure application surfaces which are parallel to the inner surfaces of the rectangular positive side opening and apply a pressing force onto the positive side terminal portion inserted through the positive side opening are formed surrounding the entire periphery of the positive side opening, and negative side pressure application surfaces which are parallel to the inner surfaces of the rectangular negative side opening and apply a pressing force onto the negative side terminal portion inserted through the negative side opening are formed surrounding the entire periphery of the negative side opening.

2. An electric double-layer capacitor according to claim 1, wherein
the positive side terminal portion and the negative side terminal portion are welded to the inner surfaces of the positive side opening and the inner surfaces of the negative side opening, respectively, over the entire peripheries thereof, via resin sheets.

3. An electric double-layer capacitor according to claim 2, wherein
the enclosure is formed of a synthetic resin having chemical resistance and thermoplasticity, and the sheet is formed of a synthetic resin having chemical resistance and thermoplasticity.

4. An electric double-layer capacitor according to claim 3, wherein
the enclosure is formed of a resin obtained by mixing one or more types of polypropylene-series, polystyrene-series, polyethylene-series, polyester-series, and polyimide-series, and the sheet is formed of a resin obtained by mixing one or more types of polypropylene-series, polystyrene-series, polyethylene-series, polyester-series, and polyimide-series.

5. An electric energy storage device including a plurality of electric double-layer capacitors according to claim 4 which are connected in series,
wherein a correction circuit for correcting a variation in voltages among the plurality of electric double-layer capacitors is contained within the electric energy storage device.

6. An electric energy storage device including a plurality of electric double-layer capacitors according to claim 3 which are connected in series,
wherein a correction circuit for correcting a variation in voltages among the plurality of electric double-layer capacitors is contained within the electric energy storage device.

7. An electric energy storage device including a plurality of electric double-layer capacitors according to claim 2 which are connected in series,
wherein a correction circuit for correcting a variation in voltages among the plurality of electric double-layer capacitors is contained within the electric energy storage device.

8. An electric double-layer capacitor according to claim 1, comprising a pressure relief valve connecting the interior of the enclosure to the exterior when a pressure in the interior of the enclosure exceeds a predetermined pressure.

9. An electric energy storage device including a plurality of electric double-layer capacitors according to claim 8 which are connected in series,
wherein a correction circuit for correcting a variation in voltages among the plurality of electric double-layer capacitors is contained within the electric energy storage device.

10. An electric double-layer capacitor according to claim 1, wherein
a reinforcing portion is provided on a surface forming the enclosure.

11. An electric energy storage device including a plurality of electric double-layer capacitors according to claim 10 which are connected in series,
wherein a correction circuit for correcting a variation in voltages among the plurality of electric double-layer capacitors is contained within the electric energy storage device.

12. An electric energy storage device including a plurality of electric double-layer capacitors according to claim 1 which are connected in series,
wherein a correction circuit for correcting a variation in voltages among the plurality of electric double-layer capacitors is contained within the electric energy storage device.

13. A method of manufacturing an electric double-layer capacitor in which an electric double-layer capacitor body having a positive side electrode and a negative side electrode which are opposed to each other via a separator is put away in the interior of an enclosure made of a resin in a state where the electric double-layer capacitor body is impregnated with an electrolyte solution, and a positive side terminal portion having a flat plate shape and a negative side terminal portion having a flat plate shape which are exposed to the exterior of the enclosure pass through a positive side opening having a rectangular shape and a negative side opening having a rectangular shape, respectively, formed on the enclosure and are connected to the positive side electrode and the negative side electrode, respectively, and positive side pressure application surfaces which are parallel to the inner surfaces of the rectangular positive side opening and apply a pressing force onto the positive side terminal portion inserted though the positive side opening are formed surrounding the entire periphery of the positive side opening, and negative side pressure application surfaces which are parallel to the inner surfaces of the rectangular negative side opening and apply a pressing force onto the negative side terminal portion inserted through the negative side opening are formed surrounding the entire periphery of the negative side opening, the method comprising:
a first welding process of welding a sheet made of a resin to each of a joint portion on the positive side terminal portion which is to be joined to inner surfaces of the positive side opening and a joint portion on the negative side terminal portion which is to be joined to inner surfaces of the negative side opening over the entire peripheries of the joint portions; and a second welding process of welding the sheet which is welded to the positive side terminal portion to the inner surfaces of the positive side opening over the entire periphery thereof while a pressing force is being applied to four surfaces of the positive side pressure application surfaces and welding the sheet which is welded to the negative side terminal portion to the inner surfaces of the negative side opening over the entire periphery thereof while a pressing force is being applied to four surfaces of the negative side pressure application surfaces.

14. A method of manufacturing an electric double-layer capacitor according to claim 13, wherein
the enclosure is formed of a synthetic resin having chemical resistance and thermoplasticity, and the sheet is formed of a synthetic resin having chemical resistance and thermoplasticity.

15. A method of manufacturing an electric double-layer capacitor according to claim 13, wherein
the enclosure is formed of a resin obtained by mixing one or more types of polypropylene-series, polystyrene-series, polyethylene-series, polyester-series, and polyimide-series, and the sheet is formed of a resin obtained by mixing one or more types of polypropylene-series, polystyrene-series, polyethylene-series, polyester-series, and polyimide-series.

* * * * *